(12) United States Patent
Peng et al.

(10) Patent No.: US 10,128,910 B2
(45) Date of Patent: Nov. 13, 2018

(54) MOBILE DEVICE WITH NEAR FIELD COMMUNICATION FUNCTION

(71) Applicant: Huawei Technologies Co., Ltd., Shenzhen (CN)

(72) Inventors: Zhonghui Peng, Shanghai (CN); Heng Wang, Shanghai (CN); Yonggang Wang, Shanghai (CN); Dongjin Chen, Shenzhen (CN); Yang Gao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/567,844

(22) PCT Filed: May 15, 2015

(86) PCT No.: PCT/CN2015/079077
§ 371 (c)(1),
(2) Date: Oct. 19, 2017

(87) PCT Pub. No.: WO2016/183736
PCT Pub. Date: Nov. 24, 2016

(65) Prior Publication Data
US 2018/0109291 A1    Apr. 19, 2018

(51) Int. Cl.
*H04B 5/00*  (2006.01)
*H04B 1/3816*  (2015.01)

(52) U.S. Cl.
CPC ............. *H04B 5/0037* (2013.01); *H04B 5/00* (2013.01); *H04B 5/0031* (2013.01); *H04B 1/3816* (2013.01)

(58) Field of Classification Search
None
See application file for complete search history.

(56) References Cited

U.S. PATENT DOCUMENTS

2009/0303015 A1* 12/2009 Teruyama ............... G06Q 20/32
340/10.2
2010/0248710 A1* 9/2010 Sklovsky ............ H04M 1/7253
455/420

(Continued)

FOREIGN PATENT DOCUMENTS

CN    104239829 A    12/2014
CN    104242995 A    12/2014

(Continued)

OTHER PUBLICATIONS

Machine Translation and Abstract of Chinese Publication No. CN104239829, dated Dec. 24, 2014, 20 pages.

(Continued)

*Primary Examiner* — Alejandro Rivero
(74) *Attorney, Agent, or Firm* — Conley Rose, P.C.

(57) ABSTRACT

A mobile device with the NFC function includes an NFC chip, multiple SIM card slots, a power supply unit, and an eSE integrated into the NFC chip. One SIM card slot is connected to a first power port on the NFC chip. The power supply unit is connected to a second power port on the NFC chip. When the mobile device performs near field communication, the second power port on the NFC chip is triggered to output a first level signal. Each of the rest SIM card slots is connected to the power supply unit. The eSE is connected to the power supply unit. The power supply unit is configured to supply power to the eSE and the SIM card slot that is connected to the power supply unit, when the first level signal is received.

10 Claims, 3 Drawing Sheets

(56) References Cited

U.S. PATENT DOCUMENTS

2012/0106219 A1* 5/2012 Okuda ............... G06K 7/10237
363/127
2014/0141844 A1 5/2014 Golla et al.
2014/0335798 A1 11/2014 Ballesteros et al.

FOREIGN PATENT DOCUMENTS

WO 2013072435 A1 5/2013
WO WO 2016183736 A1 * 11/2016 ............... H04B 5/00

OTHER PUBLICATIONS

Machine Translation and Abstract of Chinese Publication No. CN104242995, dated Dec. 24, 2014, 14 pages.
Foreign Communication From A Counterpart Application, PCT Application No. PCT/CN2015/079077, English Translation of International Search Report dated Feb. 3, 2016, 2 pages.
Foreign Communication From A Counterpart Application, PCT Application No. PCT/CN2015/079077, English Translation of Written Opinion dated Feb. 3, 2016, 5 pages.
Foreign Communication From A Counterpart Application, European Application No. 15892117.1, Extended European Search Report dated Feb. 13, 2018, 5 pages.

* cited by examiner

MOBILE DEVICE WITH NEAR FIELD COMMUNICATION FUNCTION

CROSS-REFERENCE TO RELATED APPLICATIONS

This application is a national stage of International Application No. PCT/CN2015/079077, filed on May 15, 2015, which is hereby incorporated by reference in its entirety.

TECHNICAL FIELD

The present disclosure relates to the field of near field communication technologies, and in particular, to a mobile device with an NFC function.

BACKGROUND

A near field communication (NFC) technology is a wireless communications technology that enables two devices with a distance of 10 centimeters to exchange data. According to the NFC technology, a mobile device may be used either as a contactless card or as a card reader, to provide capabilities of payment, payment, ticket, and access control of an application program.

Currently, an NFC chip is usually integrated into a mobile device, and corresponding data is stored in a subscriber identity module (SIM) card of the mobile device, so that the mobile device has an NFC function. The NFC chip integrated into the mobile device has only two power ports, a first power port and a second power port. When the mobile device is powered on, some modules that can supply power in the mobile device may supply power to the first power port (for example, a modem in the mobile device may supply power to the first power port). After the mobile device is powered off, a built-in battery on the NFC chip may supply power to the first power port. When the mobile device performs near field communication (e.g., card reading), a level signal triggered by the NFC chip in the mobile device may be presented on the second power port.

FIG. 1 shows a current mobile device that supports dual SIM cards and that is integrated with an NFC chip. The mobile device has two SIM card slots. Different SIM cards may be separately inserted in the two SIM card slots, and different information may be stored in the different SIM cards. For example, bank account information is stored in a SIM card 1 inserted in a SIM card slot 1, and transportation card information is stored in a SIM card 2 inserted in a SIM card slot 2. In this way, a user may choose to read different SIM cards according to an application scenario, to perform an operation on different accounts. The SIM card slot 1 may be connected to a first power port VCC on the NFC chip in the mobile device, and the SIM card slot 2 may be connected to a second power port VDD on the NFC chip. For such a mobile device having an NFC function, when two SIM cards are inserted in user equipment, an NFC card reading function may be implemented using any SIM card; and when the user inserts no SIM card, the NFC card reading function cannot be implemented. In FIG. 1, a switch S is further included. When the mobile device is powered on, a modem 2 supplies power to the SIM card slot 2. When the mobile device is powered off, the NFC chip supplies power to the SIM card slot 2.

NFC application programs in the mobile device may be executed by a main application program processor of the mobile device and stored in a main nonvolatile memory of the mobile device. Therefore, these NFC application programs are easily attacked. In addition, the main nonvolatile memory of the mobile device is generally insecure and cannot protect data stored in the main nonvolatile memory from being unintentionally deleted or intentionally manipulated. Generally, for this problem, a solution is to embed a secure element (SE) into the mobile device in a hardware module manner. The SE has a tamper-resistant device against an embedded microprocessor. Generally, the SE embedded in the hardware module manner is referred to as an embedded SE (eSE). Currently, the eSE is integrated into the NFC chip in the mobile device.

FIG. 2 shows a mobile device that is integrated with an NFC chip, supports dual SIM cards, and has an eSE. The NFC chip has only two power ports. Therefore, the NFC chip can supply power only to the eSE and one of SIM card slots. In FIG. 2, a SIM card slot 1 is connected to a first power port VCC, and the eSE is connected to a second power port VDD. In this way, a user can choose to perform an operation only on account information stored in a SIM card 1 inserted in the SIM card slot 1, or perform an operation only on account information stored in the eSE. For such a mobile device, when the user inserts no SIM card, an NFC card reading function may be implemented using the eSE; however, when the user inserts only one SIM card, when the SIM card is inserted in a SIM card slot 2, and if the mobile device is powered off, the mobile device cannot implement the NFC card reading function using the SIM inserted in the SIM card slot 2. That is, in this case, the user can implement the NFC card reading function only using the eSE. Therefore, for such a mobile device, when the user blindly mates a SIM card, and if the mobile device is powered off, the mobile device may implement the NFC card reading function only using the eSE.

In conclusion, when a mobile device is integrated with an NFC chip, supports dual SIM cards, and has an eSE, if a user blindly mates a SIM card, and when the mobile device is powered off, the mobile device may implement an NFC card reading function only using the eSE.

SUMMARY

Embodiments of the present disclosure provide a mobile device with an NFC function, to resolve a problem that, for a mobile device that is integrated with an NFC chip, has an eSE, and supports dual SIM cards, when a user blindly mates a SIM card, and if the mobile device is powered off, the mobile device may implement a card reading function only using the eSE.

According to a first aspect, a mobile device with an NFC function is provided, including an NFC chip integrated into the mobile device, multiple SIM card slots, a power supply unit, and an eSE integrated into the NFC chip, where one SIM card slot in the multiple SIM card slots is connected to a first power port on the NFC chip; the power supply unit is connected to a second power port on the NFC chip; when the mobile device performs near field communication, the second power port on the NFC chip is triggered to output a first level signal; each SIM card slot in the multiple SIM card slots, except the SIM card slot connected to the first power port, is connected to the power supply unit; the eSE is connected to the power supply unit; and the power supply unit is configured to, when the first level signal is received, supply power to the eSE and the SIM card slot that is connected to the power supply unit.

With reference to the first aspect, in a first possible implementation manner, the mobile device further includes a switch circuit, and each SIM card slot in the multiple SIM card slots, except the SIM card slot connected to the first power port, is connected to the power supply unit using the switch circuit; the switch circuit is further connected to a module that can supply power in the mobile device, where a quantity of modules that can supply power and that are connected to the switch circuit is equal to a quantity of SIM card slots that are connected to the switch circuit; and the power supply unit is configured to, when the mobile device is in a power-off state and the first level signal is received, supply power to the SIM card slot connected to the power supply unit; and supply power to the eSE when the first level signal is received.

With reference to the first aspect, in a second possible implementation manner, the power supply unit is a power circuit.

With reference to the first aspect, in a third possible implementation manner, the power supply unit includes a selection circuit and a control circuit; a first input end of the selection circuit is connected to the second power port on the NFC chip, a second input end of the selection circuit is connected to the control circuit, a first output end of the selection circuit is connected to the eSE, and each output end in output ends of the selection circuit, except the first output end, is connected to a different SIM card slot; the control circuit is configured to, when the mobile device is in a power-off state and a SIM card storing to-be-processed account information is inserted in the SIM card slot connected to the power supply unit, use an output end of the selection circuit as a selected output end of the selection circuit, where the output end is connected to the SIM card slot in which the SIM card storing the to-be-processed account information is inserted; and use the first output end as the selected output end of the selection circuit when the to-be-processed account information is stored in the eSE; and the selection circuit is configured to, when the first level signal is received, supply power using the selected output end of the selection circuit.

In the mobile device with the NFC function provided in the embodiments of the present disclosure, a first power port on an NFC chip may supply power to one SIM card slot in multiple SIM card slots, and a power supply unit may supply power to an eSE and the rest of the SIM card slots under control of a first level signal output by a second power port on the NFC chip. Therefore, when a user blindly mates a SIM card, regardless of which SIM card slot the SIM card is inserted in, after the mobile device is powered off, and if the mobile device performs near field communication, the NFC chip can supply, using an internal battery, power to the card slot in which the SIM card is inserted, that is, the NFC chip can supply power to the SIM card using the battery inside the NFC chip. That is, when the user blindly mates the SIM card and the mobile device is powered off, the mobile device can still implement the NFC function using the SIM card. Therefore, according to the mobile device with the NFC function provided in the embodiments of the present disclosure, when the user blindly mates the SIM card and the mobile device is powered off, the mobile device can implement the NFC function using the eSE or the SIM card.

DESCRIPTION OF EMBODIMENTS

In a mobile device with an NFC function provided in the embodiments of the present disclosure, a power supply unit may supply power to an eSE and multiple SIM card slots under control of a first level signal output by a second power port on an NFC chip. Therefore, when a user blindly mates a SIM card and the mobile device is powered off, the mobile device can implement the NFC function using the SIM card or the eSE.

The following describes, with reference to the accompanying drawings in the specification, specific implementation manners of a mobile device with an NFC function provided in the embodiments of the present disclosure.

A mobile device with an NFC function provided in an embodiment of the present disclosure includes an NFC chip integrated into the mobile device, multiple subscriber identity module SIM card slots, a power supply unit, and an embedded secure element eSE integrated into the NFC chip.

One SIM card slot in the multiple SIM card slots is connected to a first power port on the NFC chip.

The power supply unit is connected to a second power port on the NFC chip. When the mobile device performs near field communication, the second power port on the NFC chip is triggered to output a first level signal.

Each SIM card slot in the multiple SIM card slots, except the SIM card slot connected to the first power port, is connected to the power supply unit. The eSE is connected to the power supply unit.

The power supply unit is configured to, when the first level signal is received, supply power to the eSE and each SIM card slot that is connected to the power supply unit. The first level signal may be a level signal of 1.8 V.

In the mobile device with the NFC function provided in this embodiment of the present disclosure, a first power port on an NFC chip may supply power to one SIM card slot in multiple SIM card slots, and a power supply unit may supply power to an eSE and the rest of the SIM card slots under control of a first level signal output by a second power port on the NFC chip. That is, even though the mobile device is powered off, as long as the mobile device performs near field communication, the second power port on the NFC chip can output the first level signal, and the first level signal can trigger the power supply unit to supply power to the eSE and a SIM card slot connected to the power supply unit. In this case, even though the mobile device is powered off, regardless of which SIM card slot of the mobile device a SIM card is inserted in, the mobile device can implement the NFC function using the SIM card or the eSE. That is, if the mobile device with the NFC function provided in this embodiment of the present disclosure includes two SIM card slots, and when SIM cards are inserted in both the two SIM card slots, the mobile device with the NFC function provided in this embodiment of the present disclosure can still implement the NFC function in a power-off state using the eSE or either of the two SIM cards.

Figure 1:
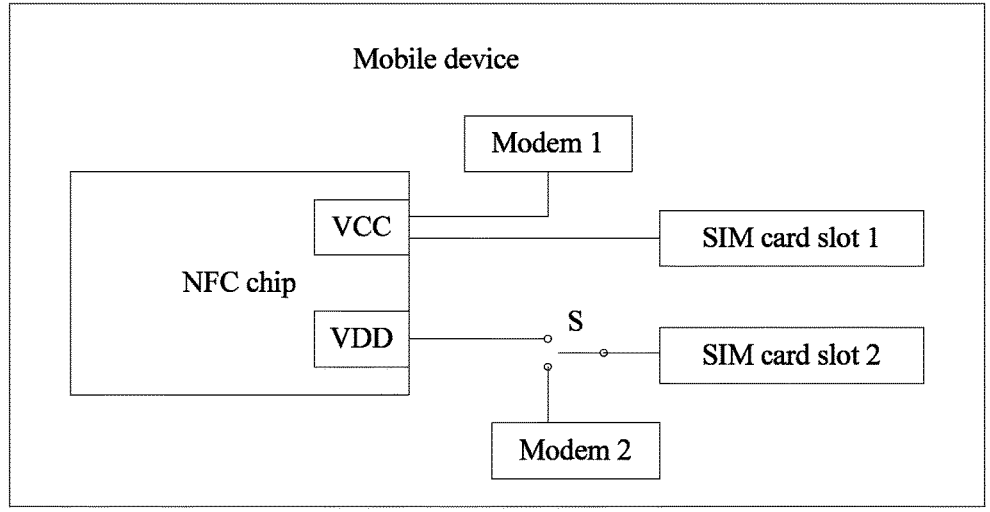
FIG. 1 is a first schematic structural diagram of a mobile device with an NFC function in some approaches.
Figure 2:
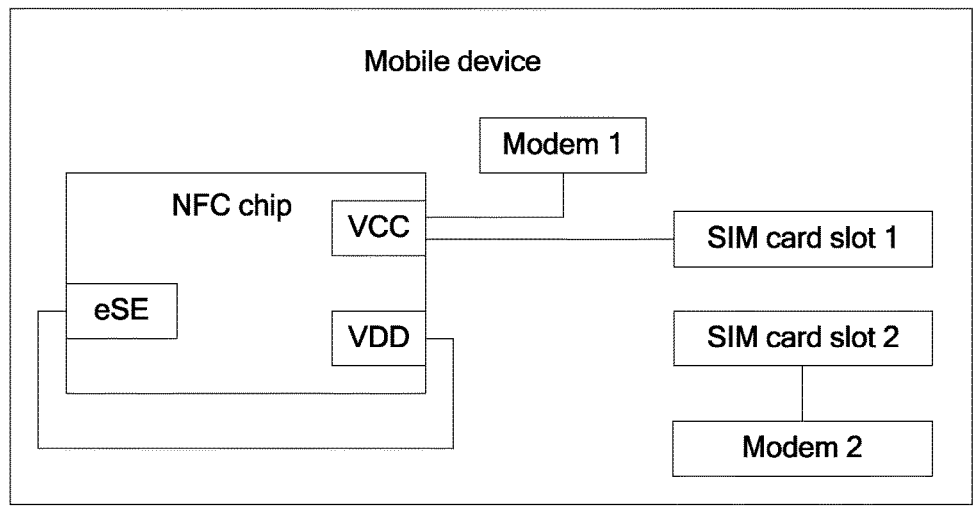
FIG. 2 is a second schematic structural diagram of a mobile device with an NFC function in some approaches.

For a mobile device shown in FIG. 1, after two SIM cards are inserted in, the mobile device can implement an NFC function only using either of the two SIM cards. For a mobile device shown in FIG. 2, after two SIM cards are inserted in, the mobile device can implement an NFC function only using either a SIM card 1 or an eSE.

Figure 3:
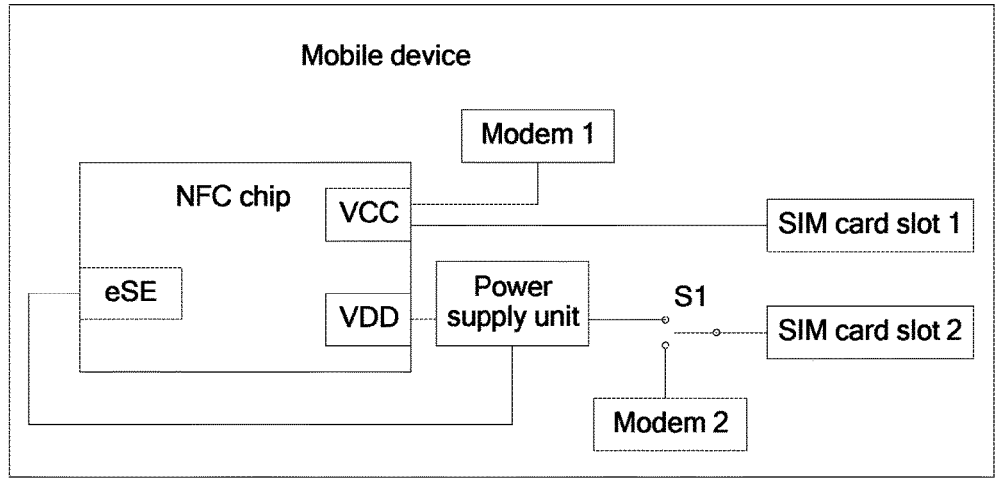
FIG. 3 is a first schematic structural diagram of a mobile device with an NFC function according to an embodiment of the present disclosure.

Optionally, as shown in FIG. 3, the mobile device with the NFC function provided in this embodiment of the present disclosure further includes a switch circuit. Each SIM card slot in the multiple SIM card slots, except the SIM card slot connected to the first power port VCC on the NFC chip, is connected to the power supply unit using the switch circuit.

The switch circuit is further connected to a module that can supply power in the mobile device, for example, a modem. A quantity of modules that can supply power and that are connected to the switch circuit is equal to a quantity of SIM card slots that are connected to the switch circuit.

The power supply unit is configured to, when the mobile device is in a power-off state and the first level signal is received, supply power to the SIM card slot connected to the power supply unit; and supply power to the eSE when the first level signal is received.

When the mobile device is in a power-on state, the module that can supply power in the mobile device supplies power to the SIM card slot connected to the power supply unit. Therefore, the power supply unit or a module that can supply power and that is connected to the switch circuit supplies power to each SIM card slot connected to the switch circuit. Different modules that can supply power and that are connected to the switch circuit supply power to different SIM card slots connected to the switch circuit.

When the mobile device with the NFC function provided in this embodiment of the present disclosure includes two SIM card slots, as shown in FIG. 3, for the mobile device with the NFC function provided in this embodiment of the present disclosure, the switch circuit includes only a switch S1. A SIM card slot 1 is connected to the first power port VCC on the NFC chip. When the mobile device is in the power-off state, the SIM card slot 1 is powered by a battery on the NFC chip using the first power port VCC. When the mobile device is in the power-on state, the SIM card slot 1 is powered by a modem 1 using the first power port VCC. A SIM card slot 2 is connected to the power supply unit using the switch S1. When the mobile device is in the power-off state, the SIM card slot 2 is powered by the power supply unit. When the mobile device is in the power-on state, the SIM card slot 2 is powered by a modem 2. In addition, the power supply unit may further supply power to the eSE under control of the first level signal output by the second power port VDD.

When the mobile device with the NFC function provided in this embodiment of the present disclosure includes N (where N is an integer greater than 2) SIM card slots, the mobile device includes N modems. The switch circuit may include N switches. All the N switches are connected to the power supply unit, and each switch is connected to one SIM card slot and one modem. Different switches are connected to different SIM card slots and different modems. When the mobile device is in the power-on state, each SIM card slot may be powered by a modem connected to a switch, where the switch is connected to the SIM card slot. When the mobile device is in the power-off state, each SIM card slot may be powered by the power supply unit.

Figure 4:
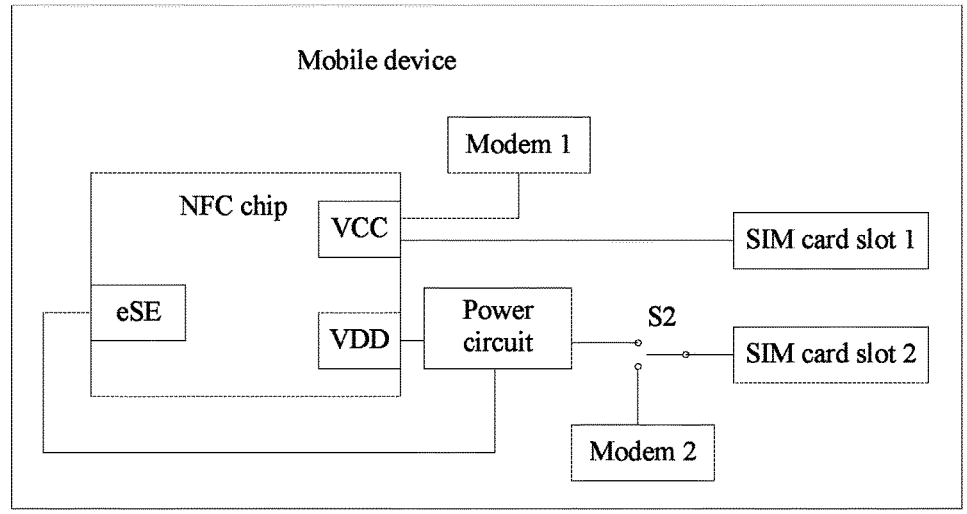
FIG. 4 is a second schematic structural diagram of a mobile device with an NFC function according to an embodiment of the present disclosure.

Optionally, for the mobile device with the NFC function provided in this embodiment of the present disclosure, as shown in FIG. 4, the power supply unit is a power circuit. For example, the power supply unit is a low dropout regulator (LDO). When output power of the power circuit is high enough, the power supply unit may simultaneously supply, under control of the first level signal output by the second power port VDD on the NFC chip, power to the eSE and each SIM card slot in the multiple SIM card slots, except the SIM card slot connected to the first power port VCC.

Figure 5:
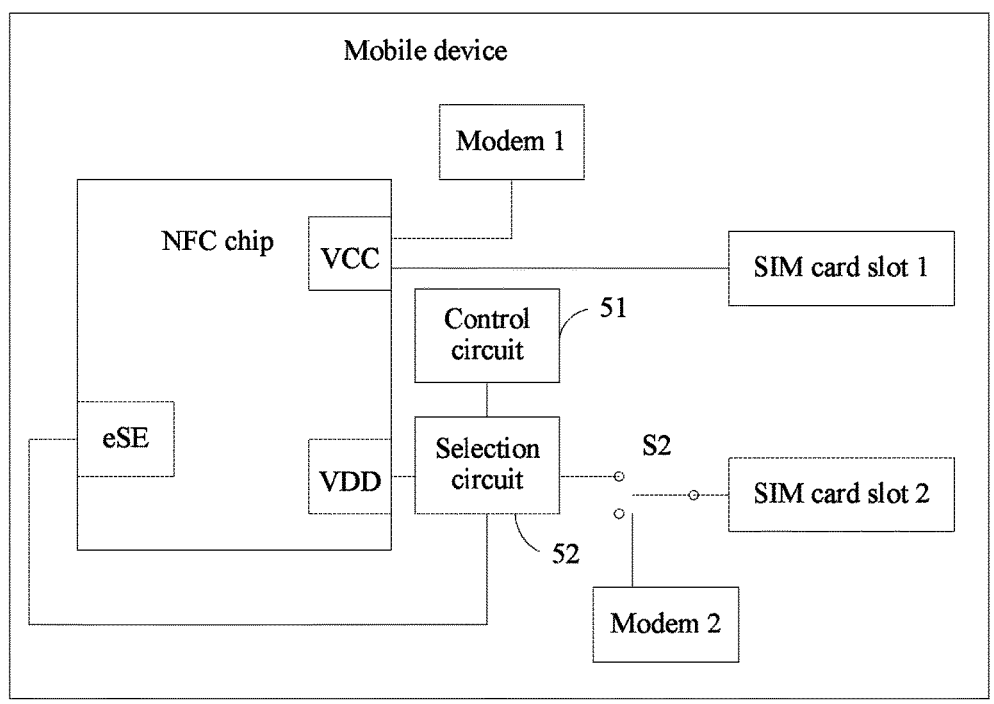
FIG. 5 is a third schematic structural diagram of a mobile device with an NFC function according to an embodiment of the present disclosure.

Optionally, for the mobile device with the NFC function provided in this embodiment of the present disclosure, as shown in FIG. 5, the power supply unit includes a selection circuit 52 and a control circuit 51.

A first input end of the selection circuit 52 is connected to the second power port VDD on the NFC chip. A second input end of the selection circuit 52 is connected to the control circuit 51. A first output end of the selection circuit 52 is connected to the eSE. Each output end in output ends of the selection circuit 52, except the first output end, is connected to one SIM card slot. Different output ends of the selection circuit 52 are connected to different SIM card slots.

The control circuit 51 is configured to, when the mobile device is in a power-off state and a SIM card storing to-be-processed account information is inserted in the SIM card slot connected to the power supply unit, use an output end of the selection circuit 52 as a selected output end of the selection circuit 52, where the output end is connected to the SIM card slot in which the SIM card storing the to-be-processed account information is inserted; and use the first output end of the selection circuit 52 as the selected output end of the selection circuit 52 when the to-be-processed account information is stored in the eSE.

The selection circuit 52 is configured to, when the first level signal is received, supply power using the selected output end of the selection circuit.

The selection circuit may be a selector switch. An input end of the selector switch is connected to the second power port VDD on the NFC chip. The control circuit controls closing between the input end that is of the selector switch and that is connected to the second power port VDD on the NFC chip and an output end of the selector switch. When the output end connected to the input end that is of the selector switch and that is connected to the second power port VDD on the NFC chip is connected to a SIM card slot, the first level signal output by the second power port VDD is directly used to supply power to the SIM card slot connected to the output end connected to the input end that is of the selector switch and that is connected to the second power port VDD on the NFC chip. When the output end connected to the input end that is of the selector switch and that is connected to the second power port VDD on the NFC chip is connected to the eSE, the first level signal output by the second power port is directly used to supply power to the eSE.

In FIG. 5, that the mobile device with the NFC function provided in this embodiment of the present disclosure includes two SIM card slots is used as an example for description. When the to-be-processed account information is stored in a SIM card inserted in a SIM card slot 2, an output end that is of the selection circuit 52 and that is connected to the SIM card slot 2 is the selected output end of the selection circuit 52. When the to-be-processed account information is stored in the eSE, an output end that is of the selection circuit 52 and that is connected to the eSE, that is, the first output end, is the selected output end of the selection circuit 52.

In the mobile device shown in any figure in FIG. 3 to FIG. 5, only power supply statuses between an NFC chip, an eSE, a SIM card slot 1, a SIM card slot 2, a modem 1, and a modem 2 are provided, and no information exchange statuses therebetween are provided. When the mobile device implements an NFC card reading function using a SIM card inserted in the SIM card slot 1, information exchange exists between the NFC chip and the SIM card inserted in the SIM card slot 1. When the mobile device implements the NFC card reading function using a SIM card inserted in the SIM card slot 2, information exchange exists between the NFC chip and the SIM card inserted in the SIM card slot 2. When the mobile device implements the NFC card reading function using the eSE, information exchange exists between the NFC chip and the eSE.

Persons skilled in the art should understand that the embodiments of the present disclosure may be provided as a method, a system, or a computer program product. Therefore, the present disclosure may use a form of hardware-only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device, system, and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations in the embodiments of the present disclosure provided that they fall within the scope of protection defined by the following claims and their equivalent technologies.

What is claimed is:

1. A mobile device with a near field communication (NFC) function, the mobile device comprising:
    an NFC chip comprising an embedded secure element (eSE);
    a plurality of subscriber identity module (SIM) card slots;
    a switch circuit; and
    a power supply,
    wherein a first SIM card slot of the plurality of SIM card slots is connected to a first power port on the NFC chip,
    wherein the power supply is connected to a second power port on the NFC chip,
    wherein the second power port on the NFC chip is triggered to output a first level signal when the mobile device performs near field communication,
    wherein each SIM card slot of the plurality of SIM card slots, except the first SIM card slot connected to the first power port, is connected to the power supply via the switch circuit,
    wherein the switch circuit is connected to a plurality of secondary power supplies configured to supply power in the mobile device,
    wherein a quantity of the plurality of secondary power supplies is equal to a quantity of SIM card slots connected to the switch circuit,
    wherein the eSE is connected to the power supply, and
    wherein the power supply is configured to:
    supply power to the eSE when the first level signal is received; and
    supply power to each SIM card slot connected to the power supply when the mobile device is in a power-off state and the first level signal is received.

2. The mobile device of claim 1, wherein the power supply is a power circuit.

3. The mobile device of claim 2, wherein the power supply is a low dropout regulator (LDO).

4. The mobile device of claim 1, wherein the power supply comprises a selection circuit and a control circuit, wherein a first input end of the selection circuit is connected to the second power port on the NFC chip, wherein a second input end of the selection circuit is connected to the control circuit, wherein a first output end of the selection circuit is connected to the eSE, wherein each of a plurality of output ends of the selection circuit, except the first output end, is connected to different ones of the plurality of SIM card slots, wherein the control circuit is configured to:
    use an output end of the selection circuit as a selected output end of the selection circuit when the mobile device is in a power-off state and a SIM card storing to-be-processed account information is inserted into one of the plurality of SIM card slots connected to the power supply, wherein the output end is connected to the one of the plurality of SIM card slots in which the SIM card storing the to-be-processed account information is inserted; and
    use the first output end of the selection circuit as the selected output end of the selection circuit when the to-be-processed account information is stored in the eSE, and
    wherein the selection circuit is configured to supply power using the selected output end of the selection circuit when the first level signal is received.

5. The mobile device of claim 4, wherein the selection circuit is a selector switch.

6. A mobile device with a near field communication (NFC) function, the mobile device comprising:
   an NFC chip comprising an embedded secure element (eSE);
   a plurality of subscriber identity module (SIM) card slots; and
   a power supply,
   wherein a first SIM card slot of the plurality of SIM card slots is connected to a first power port on the NFC chip,
   wherein the power supply is connected to a second power port on the NFC chip,
   wherein the second power port on the NFC chip is triggered to output a first level signal when the mobile device performs near field communication,
   wherein each SIM card slot of the plurality of SIM card slots, except the first SIM card slot connected to the first power port, is connected to the power supply,
   wherein the eSE is connected to the power supply, and
   wherein the power supply is configured to supply power to the eSE and the plurality of SIM card slots connected to the power supply when the first level signal is received,
   wherein the power supply comprises a selection circuit and a control circuit, wherein a first input end of the selection circuit is connected to the second power port on the NFC chip, wherein a second input end of the selection circuit is connected to the control circuit, wherein a first output end of the selection circuit is connected to the eSE, wherein each of a plurality of output ends of the selection circuit, except the first output end, is connected to different ones of the plurality of SIM card slots, wherein the control circuit is configured to:
   use an output end of the selection circuit as a selected output end of the selection circuit when the mobile device is in a power-off state and a SIM card storing to-be-processed account information is inserted into one of the plurality of SIM card slots, wherein the output end is connected to the one of the plurality of SIM card slots in which the SIM card storing the to-be-processed account information is inserted; and
   use the first output end of the selection circuit as the selected output end of the selection circuit when the to-be-processed account information is stored in the eSE, and
   wherein the selection circuit is configured to supply power using the selected output end of the selection circuit when the first level signal is received.

7. The mobile device of claim 6, wherein the selection circuit is a selector switch.

8. A mobile device with a near field communication (NFC) function, the mobile device comprising:
   an NFC chip comprising an embedded secure element (eSE);
   a plurality of subscriber identity module (SIM) card slots; and
   a power supply, wherein the power supply is a power circuit;
   wherein a first SIM card slot of the plurality of SIM card slots is connected to a first power port on the NFC chip,
   wherein the power supply is connected to a second power port on the NFC chip,
   wherein the second power port on the NFC chip is triggered to output a first level signal when the mobile device performs near field communication,
   wherein each SIM card slot of the plurality of SIM card slots, except the first SIM card slot connected to the first power port, is connected to the power supply,
   wherein the eSE is connected to the power supply, and
   wherein the power supply is configured to supply power to the eSE and the plurality of SIM card slots connected to the power supply when the first level signal is received,
   wherein the power supply comprises a selection circuit and a control circuit, wherein a first input end of the selection circuit is connected to the second power port on the NFC chip, wherein a second input end of the selection circuit is connected to the control circuit, wherein a first output end of the selection circuit is connected to the eSE, wherein each of a plurality of output ends of the selection circuit, except the first output end, is connected to different ones of the plurality of SIM card slots, wherein the control circuit is configured to:
   use an output end of the selection circuit as a selected output end of the selection circuit when the mobile device is in a power-off state and a SIM card storing to-be-processed account information is inserted into one of the plurality of SIM card slots connected to the power supply, wherein the output end is connected to the one of the plurality of SIM card slots in which the SIM card storing the to-be-processed account information is inserted; and
   use the first output end of the selection circuit as the selected output end of the selection circuit when the to-be-processed account information is stored in the eSE, and
   wherein the selection circuit is configured to supply power using the selected output end of the selection circuit when the first level signal is received.

9. The mobile device of claim 8, wherein the power supply is a low dropout regulator (LDO).

10. The mobile device of claim 8, wherein the selection circuit is a selector switch.

* * * * *